United States Patent

[11] 3,632,466

| [72] | Inventor | Charles R. Peaker<br>Naugatuck, Conn. |
|---|---|---|
| [21] | Appl. No. | 587,650 |
| [22] | Filed | Oct. 19, 1966 |
| [45] | Patented | Jan. 4, 1972 |
| [73] | Assignee | Uniroyal, Inc. |

[54] STABILIZED LATEX COATING COMPOSITION CONTAINING AN ALKYL SULFIDE TERMINATED OLIGOMER
20 Claims, No Drawings

[52] U.S. Cl. ............................................. 161/67,
260/29.6 XA, 260/29.6 AN, 260/29.6 RW,
260/29.7 UP, 260/41.5 R, 260/45.9, 260/78.5,
260/80 P
[51] Int. Cl. ....................................................... C08h 13/08
[50] Field of Search............................................. 260/29.7
UP, 78.5, 80.3 N, 79, 80 P, 79.5 C, 29.6, 29.6 RW,
820; 161/67

[56] References Cited
UNITED STATES PATENTS

| 2,396,997 | 3/1946 | Fryling | 260/79.5 |
|---|---|---|---|
| 2,848,434 | 8/1958 | Hellman | 260/29.6 R |
| 3,131,158 | 4/1964 | Kemp et al. | 260/29.7 H |
| 3,293,104 | 12/1966 | Hull | 161/67 |
| 3,390,034 | 6/1968 | Hull | 161/67 |
| 3,309,259 | 3/1967 | Schwartz | 161/67 |
| 3,498,943 | 3/1970 | Dannals | 260/29.6 RU |
| 3,498,942 | 3/1970 | Dannals | 260/29.6 RU |

*Primary Examiner*—Donald J. Arnold
*Attorney*—Bert J. Lewen

ABSTRACT: A stabilized latex coating composition containing a stabilizer, an inert filler and an alkyl sulfide terminated oligomer having an average molecular weight between about 200 and 5,000.

STABILIZED LATEX COATING COMPOSITION CONTAINING AN ALKYL SULFIDE TERMINATED OLIGOMER

This invention relates to a new and improved latex coating composition for coating textiles, such as carpets; the process of applying these compositions to the textiles; and the coated articles formed by the aforesaid process.

Conventionally, textile fabrics are coated or "backed" with latex in order to provide skid resistance or, in the case of tufted fabric, to lock the tufts in position. The amount of latex needed for a given area is significantly affected by the penetration of the latex into the textile fabric. Obviously, a surface coating consumes less latex if impregnation is minimized.

Where the latex is employed to bond two materials together, as in secondary backed carpets, another important quality of the coating composition is good "guick-set" behavior i.e., the property of developing considerable adhesive strength between the plies even while there remains a large amount of water. This property, while common in natural rubber latex, is difficult to achieve with conventional synthetic rubber latexes.

Another advantage of using less latex per unit area is in the coating operation itself. Less latex applied means less water to be evaporated in bringing about the drying of the coated textile, and hence greater processing speed.

Still a further property of the latex coating composition is its ability to accept filler without foaming and in amounts great enough to significantly reduce the cost of the composition.

The instant invention describes a latex coating composition having outstanding "quick-set" properties and the ability to accept large amounts of filler directly and without foaming. Additionally, when the composition is used for coating, the penetration can be controlled.

In brief compass, the coating composition is a stabilized latex containing an "alkyl sulfide terminated oligomeric emulsifier," as hereinafter defined. The latex is formed by emulsion polymerization with the aforesaid emulsifier and thereafter stabilized. As is well known in the art, stabilizers are particularly necessary, when large amounts of filler (e.g., 300 parts or more) are added, to prevent flocculation of the polymer particles.

As another embodiment of the instant invention, it has been discovered that additional stabilization may be conferred on the latexes of the invention by using a stabilizer which does not substantially reduce the surface tension of the latex. The effect of the stabilizer on surface tension may be ascertained by forming a 1 percent aqueous solution thereof. If the aqueous solution has a surface tension greater than 50 dynes/cm. the stabilizer will not substantially reduce the surface tension of the latex. These stabilizers serve to assist the wetting out and dispersion of the filler and are present in from 0.2 to 10 parts, preferable 0.4 to 5 parts, per hundred parts of latex (dry weight basis). Greater amounts of stabilizer may be used, but this will adversely affect the "quick-set," washability and adhesivity of the coating composition.

Examples of suitable stabilizers are alkali metal polyphosphates, e.g., tetrasodium pyrophosphate, tetrapotassium pyrophosphate and sodium hexametaphosphate; alkali metal metasilicates, e.g. sodium metasilicate; condensation products of formaldehyde with napthalene sulfonic acid, e.g., Daxad 11 and 15 (Dewey and Almy Chem. Co.) and Darvan No. 1 (R. T. Vanderbilt Co.); and, though not as effective as the aforesaid compounds, the alkali metal salts of carboxylated polyelectrolytes (polymerized carboxylic acids), e.g., Daxad 30 (Dewey and Almy Chem. Co.) and Darvan No 7 R. T. Vanderbilt Co.). The aforesaid stabilizers do not interfere with the control of the penetration properties of the coating composition.

Many conventional stabilizers, unexpectedly, are either incompatible with the latex, or do not prevent its flocculation by large amounts of filler. Specifically, those which cause destabilization are Triton X-405 (octyl phenoxy polyethoxy ethanol) and Triton X-202 (sodium salt of alkyl aryl polyether sulfate). Those which do not assist stability towards filler addition are Nacconol NRSF, 90F, Ultrawet DS (alkyl aryl sulfonates), Aquarex WAQ (sodium alkyl sulfate), Tergitol 7 (sodium sulfate derivative of 3,9-diethyl-tridecanol-6) and Emulfor ON-870 (polyoxyethylated fatty alcohol).

Conventional surface active agents, such as those described in the preceding paragraph, may be added to the stabilized coating compositions containing filler in order to achieve the exact penetration (surface tension) desired for use in the coating operation.

The dry fillers may be added directly to the latex. Where the composition is used for carpet backing, from 100 to 1,000 parts per hundred parts of latex (dry weight basis), preferably from 200 to 400 parts, are present. For other applications, from trace amounts to 2,500 parts may be present. The disadvantageous practice of adding the filler to the latex as a dispersion in a water solution need not be used. The addition of the dry filler directly avoids diluting the coating composition and permits the maintenance of a high solid concentration.

Fillers serve to add weight to the carpet and reduce compound cost. Calcium carbonates, ranging from ground crude limestone to products purified by various flotation or water treatments; kaolinite-type clays, which may be similarly treated, with removal of iron salts, etc.; and barytes (barium sulfate) are the common fillers. Carbonate fillers are the most common, but, if a stiffer "hand" is required, clay or a mixture of the two fillers is used. Sometimes small amounts of color pigments may be added to give whiter color (titanium dioxide), gray color (carbon black), or tan color ( iron oxides).

A defoamer, which was almost always needed with prior latex compositions, especially if the latex had a low surface tension (e.g., 45 dynes/cm. or less), is not required in the coating composition because of its high surface tension. Not even the air carried in with the filler causes a foaming problem.

A thickener, usually an aqueous solution of a sodium polyacrylate, is added in amounts between 1.0 to 2.0 parts per hundred of latex solids to control viscosity of the compound for application. Other high molecular weight, water soluble polymers may be used.

THE EMULSIFIER

Broadly, the "alkyl sulfide terminated oligomeric emulsifiers" are alkyl sulfide terminated compounds having a backbone of from four to 100 carbon atoms in addition to those of the alkyl sulfide group. Attached to the oligomeric carbon atoms are appendant polar groups. At least one polar group is present for each two carbon atoms in the chain. The emulsifiers are water soluble, either as acids or as alkaline salts, and have a very narrow molecular weight distribution, e.g., the polydispersity index is always less than two and frequently as low as 1.4 to 1.5, as determined by the Gel Permeation Chromatographic technique.

The emulsifiers may be further defined as falling into the following two classes:

The acid form of the first class has the formula:

$$R-S-(CH_2-CHCN)_a-(CH_2-CH_1COOH)_b-H$$

where R is a primary or secondary alkyl having from six to 12 carbon atoms, preferably a normal alkyl group having from seven to 11 carbon atoms, and, most desirably, eight or 10 carbon $R_1$ is either hydrogen or methyl; $a+b$, the degree of polymerization, is broadly from four to 50, preferably from 12 to 30, and $a/a+b$ is 0 to , most preferably 0.2 to 0.55. For use as an emulsifier, this class of oligomers is converted to the water-soluble ammonium, lower alkyl and alkanol substituted ammonium, or alkali metal salts.

The acid form of the other class of emulsifiers has the formula:

$$R-S(CH_2-CR_1COOH)_a-(CH_2-CR_2CONH_2)_b-H$$

where R is a primary or secondary alkyl, preferably a normal alkyl group having from six to 20 carbon atoms, and preferably, from seven to 12 carbon atoms; $R_1$ is either hydrogen, methyl or $-CH_2COOH$; $R_2$ is hydrogen or methyl;

$a+b$, the degree of polymerization, is broadly from 6 to 50, preferably from 12 to 30, and $a/a+b$ is .075 to 0.40, most preferably 0.075 to 0.30. When a monofunctional acid is present, the upper portion of the ranges are preferred while, for difunctional acids, the lower portions are preferred, i.e., 0.075 to 0.15.

Since this class is water soluble it may be used in its acid form or converted into its water-soluble salts as described above.

Examples of the compounds of the instant invention are:

| | | $a+b$ | $\frac{a}{a+b}$ |
|---|---|---|---|
| (1) | $n\text{-}C_8H_{17}S\left[CH_2\text{-}CH\underset{CN}{\vert}\right]_8\left[CH_2\text{-}CH\underset{COOH}{\vert}\right]_8\text{-}H$ | 16 | 0.5 |
| (2) | $n\text{-}C_8H_{17}S\text{-}\left[CH_2\text{-}CH\underset{CN}{\vert}\right]_8\left[CH_2\text{-}CH\underset{COOH}{\vert}\right]_{12}\text{-}H$ | 20 | 0.4 |
| (3) | $n\text{-}C_8H_{17}S\text{-}\left[CH_2\text{-}\underset{COOH}{\overset{CH_2COOH}{\vert}}C\right]_2\left[CH_2\text{-}CH\underset{CONH_2}{\vert}\right]_{18}\text{-}H$ | 20 | 0.1 |
| (4) | $n\text{-}C_{12}H_{25}S\text{-}\left[CH_2\text{-}CH\underset{COOH}{\vert}\right]_4\left[CH_2\text{-}CH\underset{CONH_2}{\vert}\right]_{16}\text{-}H$ | 20 | 0.2 |
| (5) | $n\text{-}C_8H_{17}S\text{-}\left[CH_2\text{-}\underset{COOH}{\overset{CH_3}{\vert}}C\right]_4\left[CH_2\text{-}CH\underset{CONH_2}{\vert}\right]_{16}\text{-}H$ | 20 | 0.2 |
| (6) | $n\text{-}C_8H_{17}S\text{-}\left[\underset{COOH}{\overset{CH}{\vert}}\text{-}\underset{COOH}{\overset{CH}{\vert}}\right]_2\left[CH_2\text{-}CH\underset{CONH_2}{\vert}\right]_{18}\text{-}H$ | 20 | 0.1 |
| (7) | $n\text{-}C_8H_{17}S\text{-}\left[CH_2\text{-}CH\underset{COOH}{\vert}\right]_4\left[CH_2\text{-}\underset{CONH_2}{\overset{CH_3}{\vert}}C\right]_{16}\text{-}H$ | 20 | 0.2 |

It should be understood that the monomer units are randomly distributed in the oligomer and the above structural formulas are used for convenience only.

The average molecular weight of the emulsifiers is less than 5,000, preferably less than 2,000, but higher than 200.

The first class of emulsifiers is prepared by reacting the alkyl mercaptan with (1) acrylonitrile and (2) acrylic acid or methacrylic acid. The second class is made by reacting the alkyl mercaptan with (1) acrylamide or methacrylamide and (2) itaconic acid, acrylic acid or methacrylic acid.

The reactions are performed in an essentially water-free reaction medium, preferably in a lower alcohol having a boiling point of less than 100° C., e.g., methanol, ethanol and propanol. Other solvents which dissolve the reactants and the catalyst may also be advantageously used.

Generally, the reaction temperature is maintained at 20°–60° C. Temperatures of up to 100° C. may be used. Optimum temperature may readily be determined for each polymerization and depends on the reaction and relative reactivity of the monomers. In order to facilitate the free radical propagation necessary for an effective catalytic reaction, an oxygen-free atmosphere is desirable. This may be obtained by bubbling an inert gas such as nitrogen through the reaction system.

The catalyst employed must be a free radical initiator, such as, a peroxide and persulfate. These materials are well known in the art. As required, activators may be added as, for example, N,N-dimethylaniline. Particularly outstanding results are obtained with organic peroxides and hydroperoxides, hydrogen peroxide, diazo compounds such as diazo bis(isobutyronitrile) and water soluble persulfates. Specific examples include ammonium persulfate, the alkali metal and alkaline earth metal persulfates and the alkyl peroxides, such as lauroyl peroxide, cyclohexyl peroxide and t-butyl peroxide. Catalytic amounts of initiator are used, i.e., between 0.1 and 6.0 grams per total moles of monomer, depending on the particular initiator and the monomer system. For example, from 0.1 to 0.5 grams of the ammonium persulfate catalyst are employed per gram mole of monomer (calculated as total moles monomer). If the catalyst is lauroyl peroxide, the range is 0.5 to 6.0 g. While lesser amounts can be used, they will decrease the conversion. Greater amounts give no significant advantage.

A convenient method for carrying out the reaction is to dissolve the alkyl mercaptan initially and the monomer or monomers, as the case may be, in the alcoholic solvent. Thereafter, the catalyst, also dissolved in the solvent, is added slowly. Upon completion of the reaction, the reaction product, if it is homogeneous, may be treated with an aqueous base, as for example an alkali metal hydroxide, such as potassium hydroxide, to neutralize the acid present to a pH of from about 6.5 to 8.5. By vacuum stripping, the solvent may be separated, leaving a water solution of the salt, e.g., the potassium salt, of the oligomers of the instant invention. However, if the reaction product is heterogeneous, as for example some oligomers precipitate out of the alcohol solvent as they are formed, the product may be isolated by filtration, washing and drying. These products may dissolve in water.

THE EMULSION POLYMERIZATION

The emulsion polymerization for forming the latex used in the coating composition may be applied to the preparation of a wide variety of addition polymers. These polymers are formed by the polymerization of vinyl, i.e., copolymerizable monoethylenically unsaturated compounds, and/or conjugated diolefinic monomers. Among the conjugated diolefin polymers and copolymers are butadiene, butadiene-styrene, butadiene-acrylonitrile, butadiene-vinylidene chloride, and butadiene-methacrylonitrile. The vinyl-type polymers and copolymers are styrene-acrylonitrile, styrene, styrene-methacrylonitrile, ethyl acrylate, ethyl acrylate-vinyl acetate, ethyl acrylate-methyl methacrylate, ethyl acrylate-styrene, ethyl acrylate-butyl acrylate and butyl acrylate-acrylonitrile.

The addition polymers produced by the emulsion polymerization may be of rubber or plastic type, and consequently their emulsions could be termed rubber latex or plastic latex.

Particularly preferred polymers of the instant invention are the carboxylated conjugated diolefin type. These include butadiene-styrene or butadiene-acrylonitrile with itaconic acid, acrylic acid, methacrylic acid, maleic acid, fumaric acid, cinnamic acid, vinylacrylic acid, ethacrylic acid, 2-ethyl-3-propylacrylic acid, beta-acryloxy-propionic acid and sorbic acid.

The relative amounts of the aforesaid monomers vary wisely and are well known to those skilled in the art. In the case of the carboxylated butadiene-styrene latexes the amount of polymerized butadiene and styrene varies from 30 to 70 percent by weight based on the total weight of latex and the amount of the carboxyl component generally ranges from 0.5 to 5 percent of the total polymerized monomers.

The emulsion solution, i.e., the salt of the oligomer and water, contains from 10 to 60 percent solids and has a surprisingly low viscosity, e.g., 1-10 cp., at 10 to 20 percent solids. Generally, 100 parts by weight of monomer for each 4 or 5 parts of solids in the emulsifier solution are introduced into the reaction vessel at a temperature of about 50° C. at a pressure of 35-45 p.s.i.g. These conditions are typical and may be varied within wide ranges according to known emulsion polymerization technology.

The range of typical emulsion polymerization recipes and reaction conditions are given in table A.

Table A

| Component | Parts by Weight Broadly | Preferably |
| --- | --- | --- |
| Monomers | 100 | 100 |
| Water | 70-240 | 90-180 |
| Emulsifier | 2-8 | 3-6 |
| Modifier | 0-1.0 | 0-0.5 |
| Initiator | 0.2-2.0 | 0.3-1.5 |
| Electrolyte | 0-2.0 | 0-0.8 |
| Chelating Agent | 0-0.1 | 0-0.07 |
| Reaction Conditions | | |
| Temperature, °C. | -25°-100° | 30°-70° |
| Time, hrs. | 10-200 | 15-36 |

The various modifiers, initiators electrolytes and additives employed are conventional and are known to those skilled in the art. See Whitby, *Synthetic Rubber*, John Wiley & Sons, Inc., New York, 1954, pp. 224-283. As modifiers, aliphatic mercaptans are most commonly employed; and initiators include redox systems, which generate free radicals, with or without complexing agents, and variable valence metal ions. Common initiators are persulfates, peroxides, hydroperoxides, ferricyanides, peroxamines, and diazo compounds such as diazo bis(isobutyro-nitrile).

After about 95 to 100 percent conversion of monomer to polymer is achieved, the pH of the emulsion is increased to 8.5-9.5 with a base such as ammonium hydroxide. Any unreacted monomer may be driven off by bubbling steam through the solution. Examples of the preparation of various latexes useful for preparing the coating compositions of the invention are described in copending U.S. application Ser. Nos. 562,097 and 562,098, both filed July 1, 1966.

CARPET COATING

In applying the latex coating compound to the carpet, it is necessary to maintain a balance between the properties of the latex compound and the mechanical operation of the coater. In general, it is desirable to control the degree of penetration so that sufficient latex is deposited to give adequate tuft lock, or adequate adhesion to the secondary backing, with the minimum consumption of the coating composition. In practice, this is done by (1) maintaining high solids in the coating composition, (2) using a composition of relatively high viscosity, (3) avoiding or keeping to a minimum additional wetting agents, (4) adjusting roll speeds and direction, and tension of the carpet over the roll, and (5) scraping or "doctoring" excess material off the backing. The coating composition of the invention is particularly outstanding in that the first three of the aforesaid criteria may be readily satisfied.

Since the coating composition of the invention has a high surface tension, which may be precisely adjusted where as absorptive yarn or a relatively open mesh fabric backing is being used, control of penetration need not depend solely on increasing viscosity, adjustment of roll speeds and direction, tensioning of the carpet and doctoring off the excess. These latter criteria are extremely sensitive and minor variations can result in the deposition of too much or too little latex. Too little results in an improperly bonded carpet and excessive amounts require the evaporation of more water and slower operating speeds.

In some types of carpet dryers, notably the so-called Dalton three-pass dryer, where the lamination is made by coating the carpet, laminating the jute secondary, and passing through the dryer with the face yarns or "pile" down, poor "quick set" properties may allow the carpet to separate from the secondary jute either prior to, or at the point of, making the first turn to go back through the dryer. This difficulty is substantially eliminated by using the coating composition of the invention.

Drying is done under tension on tenter frames. Usually dryers operate at temperatures of 260°-400° F., with circulating air being blown over the carpet. Lower temperatures are used for certain fibers such as polypropylene, which may become distorted with heat and flattened by rolls. Drying times may range up to 15-20 minutes; but this is dependent on the type of oven, temperature, amount of water being evaporated, and the construction of the carpet (high pile vs. low pile).

In order to illustrate more fully the instant invention, attention is directed to the following examples:

EXAMPLE 1

A latex was prepared by emulsion polymerization of the monomers, butadiene (40 parts) styrene (59), itaconic acid (1), using as emulsifier 3 parts/100 parts of monomers of the calcium salt of a polymer prepared from acrylamide, itaconic acid, and n-octyl mercaptan. The emulsifier has the formula: n—octyl—S—$(CH_2—C(CH_2COOH)COOH)_2$—$(CH_2$—$CHCONH_2)_{18}$—H. The pH of the latex was raised to over 9 with sodium hydroxide, after removal of unreacted monomers, and the latex was concentrated to about 50 percent solids. The surface tension of this latex, determined at 40 percent total solids, was 65.8 dynes/cm., quite close to that of water (about 72 dynes/cm.).

A compound was prepared by mixing together the following ingredients:

Table I

| | Parts Dry Wt. | Wet Wt. |
| --- | --- | --- |
| Latex (as above) 50% | 100 | 200 |
| Antioxidant Emulsion (alkylated p-cresol)- 50% | 2 | 4 |
| Sodium Hexametaphosphate | 1 | 2.5 |
| | 103 | 206.5 |

To this compound was added rapidly, with stirring, 200 parts of calcium carbonate filler. The filler mixed in with almost no foaming; there was very little trapped air, and no evidence of coagulation of the polymer.

To another sample of the same type of latex, compounded as above, rapid additions of 200, 300 and 600 parts of the carbonate filler were made. Again there was no appreciable foaming or evidence of coagulation.

This shows that in spite of the very high surface tension of this latex, it will wet out and accept fillers very rapidly, without becoming unstable, and without foaming from the entrapped air carried in with the filler. With latexes prepared on conventional emulsifiers, it is necessary to use defoamers, or wait till the foam subsides before proceeding further in compounding.

EXAMPLE 2

To demonstrate the outstanding "quick set" properties of the coating composition of the invention, samples of nylon-tufted carpet are coated with weighed amounts of latex to give a known weight of dry compound per square yard. The secondary jute backing fabric is applied on this latex layer and rolled down with light pressure. The laminate is put into an oven at 260°–300° F. for short intervals. The samples are removed and the secondary backing immediately stripped off, using a modified Scott tensile tester to obtain an average adhesion value. The value may be recorded as pounds pull per 3-inch wide strip. After 3-minute and 6-minute drying intervals, the latex compounds contain 75 and 50 percent, respectively, of the original water in the coating composition, i.e., they are still a long way from being dried out.

The three latex coating compositions compared in this test are brought to a pH of 9 to 9.5 with aqueous ammonia and have a total solids content of 68 percent. Sufficient sodium polyacrylate is added to obtain a 9,000 viscosity (Brookfield No. 4 Spindle at 10 r.p.m.).

(1) Hevea natural rubber latex containing 1 part of potassium oleate and 1 part of tetrapotassium pyrophosphate.

(2) A latex prepared by emulsion polymerization of butadiene (40) styrene (59) itaconic acid (1) using 5.1 parts of the potassium salt of the emulsifier having the formula n—$C_8H_{17}$—S—$(CH_2$—$CHCN)_8$—$(CH_2$—$CHCOOH)_8$—H containing 0.5 parts of tetrapotassium pyrophosphate and 0.75 parts of sodium salt of formaldehyde condensed naphthalene sulfonic acid.

(3) A carboxylated latex similar to (2) prepared with a sodium salt of an alkyl aryl sulfonate (conventional emulsifier) and 1 part of tetrapotassium pyrophosphate.

The "quick set" ability of the various latexes containing the amounts of filler indicated is shown in the following table.

| | Potassium persulfate | 1.0 | 1.0 | 1.0 | 1.0 |
|---|---|---|---|---|---|
| | t-dodecyl mercaptan | 0.1 | 0.1 | 0.1 | 0.1 |
| | Tetrasodium ethylene-diamine tetraacetate | 0.07 | 0.07 | 0.07 | 0.07 |
| | Water | 90 | 90 | 90 | 90 |

Four parts, per 100 parts of monomer, of n—octyl—S—$(CH_2$—$CHCN)_8$—$(CH_2$—$CHCOOH)_8$—H, neutralized with potassium hydroxide, were used as the emulsifier.

These latexes were compounded with 0.5 part tetrapotassium pyrophosphate, 1 part of a polymerized sodium salt of alkyl-naphthalene sulfonate, and 300 parts of Georgia No. 10 calcium carbonate, then thickened to a viscosity of about 9,000 cps. (Brookfield No. 4 at 10 r.p.m.) with sodium polyacrylate.

| | A | B | C | D |
|---|---|---|---|---|
| Drying Time (min.) at 260° F. | Adhesion, lbs./3 in. | | | |
| 3 (partially dried) | 0.5 | 0.66 | 0.44 | 0.44 |
| 6 (partially dried) | 2.7 | 3.3 | 2.3 | 2.4 |
| 15 (completely dried) | 17 | 12.5 | 17.5 | 16 |

These data demonstrate that good quick-set and final adhesive values can be obtained whether or not an unsaturated acid is added prior to polymerization. Generally, latexes made with the unsaturated acid present are preferred, because of their inherently greater stability to handling and processing, but this is not essential to the development of good adhesive properties.

TABLE II

| | Latex type | | | | | | |
|---|---|---|---|---|---|---|---|
| | (1) Natural rubber latex | | | (2) Synthetic latex of the invention | | | (3) Conventional synthetic latex |
| Run Number | a | b | c | d | e | f | g |
| Whiting/parts/100 polymer | 200 | 200 | 400 | 300 | 300 | 400 | 200 |
| Temperature of drying (° F.) | 260 | 300 | 300 | 260 | 300 | 300 | 300 |
| Adhesion, lbs./3 in. after indicated drying time: | | | | | | | |
| 3 min | 1.1 | 1.3 | 0.9 | 0.5 | 0.7 | 0.6 | 0.4 |
| 6 min | 3.5 | 6.0 | 2.5 | 2.2 | 3.8 | 3.3 | 2.0 |

A comparison of (g) with (e), shows that the compound made according to this invention gives superior quick-set to conventional latex, even at a higher filler level (300 vs. 200 parts), and hence at lower cost per pound of compound. This is even more evident by comparing (g) and (f). Essentially equivalent results are obtained with (d) and (g), but (d) has a lower cost per pound of compound, and in addition, develops its quick-set properties at a lower temperature which would be an advantage in processing temperature-sensitive fibers, such as polypropylene. In comparison with natural latex, (f) gives as good as or better results than (c) for the same loading of filler. This is a surprising and unexpected result of great practical importance. Carpet mills can operate with the inventive latex composition with more dependability, even at high filler loadings.

EXAMPLE 3

To demonstrate the adhesivity and quick-set properties of other latexes, additional tests were performed.

The four latexes have the following polymerization recipes:

Table III

| Component | Parts by Weight | | | |
|---|---|---|---|---|
| | A | B | C | D |
| Butadiene | 40 | 40 | 40 | 40 |
| Styrene | 59 | 60 | 59 | 59 |
| Itaconic Acid | 1.0 | | | |
| Acetic Acid | | | 0.92 | |
| Acrylic Acid | | | | 1.0 |

EXAMPLE 4

An important advantage of the coated article of the invention is that the latex backing is capable of withstanding washing operations (or exposure to hot water in dye baths). To illustrate this, latexes were polymerized using:

Table IV A

| Component | Parts by Weight |
|---|---|
| Butadiene | 40 |
| Styrene | 59 |
| Itaconic acid | 1 |
| t-dodecyl mercaptan | 0.1 |
| Ammonium persulfate | 1.25 |
| Tetrasodium ethylenediamine tetraacetate | 0.07 |
| Water | 90 |

Three coating compositions were formed using 5 parts for each 100 parts of monomer of the following emulsifiers (A) n—octyl—S—$(CH_2$—$CHCOOH)_4$—$(CH_2$—$CHCONH_2)_{16}$—H, fully neutralized with ammonia, (B) n—octyl—S—$(CH_2$—$C(CH_2$—$COOH)COOH)_2$—$(CH_2CONH_2)_{18}$—H fully neutralized with ammonia and (C) the conventional aryl alkyl sulfonate.

The coating compositions were neutralized to a pH between 9 and 9.5 with aqueous ammonia and contained 200 parts/100 parts latex solids of whiting (Georgia No. 10) and 1 part of a phenolic antioxidant. The total solids of each composition was about 40 percent.

These compositions were lightly coated on the back of a nylon plush fabric, dried for about 10 minutes at 300° F., and, after cooling, were washed in a home automatic type laundry for 3 cycles of 6 minutes each.

Weight losses and appearance are shown below.

Table IV B

|  | A | B | C |
|---|---|---|---|
| Original Wt. Coated | 17.5 g. | 18.0 g. | 17.5 g. |
| Weight After Wash and Dry | 16.3 g. | 17.0 g. | 13.3 g. |
| Loss | 1.2 g. | 1.0 g. | 4.2 g. |
| % Loss | 6.0 | 5.6 | 24.0 |
| Appearance | Slight Fraying | Slight Fraying | Badly Frayed |

Much of the loss in (C) is due to fiber loss. This shows that this type of latex of the invention has good water resistance and the ability to hold a fibrous structure together under the action of water and mechanical forces much better than a compound prepared on a conventional emulsifier.

EXAMPLE 5

Many of the coating compositions of the invention, with or without filler present, will not wet a 9 ounce jute fabric, such as is conventionally used for the secondary backing of carpets; this is so, even if the compound is diluted to a lower solids content. A similar compound, made with a latex prepared on conventional emulsifiers, wets the jute fabric very readily.

By adding small amounts of surfactants such as salts of alkyl aryl sulfonates to the coating composition, the coating composition can be made to wet the jute fabric to the exact degree desired. Latexes polymerized on conventional emulsifiers already have a low surface tension (30—45 dynes/cm.) and there is no convenient or inexpensive way in which the wetting-out properties can be decreased.

The following table shows the effect of adding up to four parts of an alkyl aryl sulfonate (Nacconol NRSF) to the coating composition (2d) of example 2:

Table V

| Alkyl Aryl Sulfonate (Pts/100 pts of Polymer) | Surface Tension (Dynes/cm.) | Adhesion (lbs/3 in.) |
|---|---|---|
| 0 | 69.3 | 16.0 |
| 2 | 59.4 | 15.0 |
| 3 | 50.2 | 17.5 |
| 4 | 41.6 | 10.0 |

The above table shows that the addition of up to three parts of the surfactant did not affect adhesion (as determined by the Scott tensile tester described in example 2). Since reliable surface tension data cannot be obtained on the loaded and thickened coating composition, the above surface tensions were measured prior to the addition of the filler and thickener. Control of wetability can also be achieved by blending the coating compositions of the invention with conventionally emulsified latexes.

EXAMPLE 6

As noted previously, the use of the coating composition of the instant invention facilitates processing. While the rate of drying does not vary with the coating composition (at the same water levels), two factors permit more rapid production, namely, the better quick-set properties and, because of controlled penetration, reduced application levels which decrease the amount of water which need be evaporated. Comparisons of the production rates for the coating composition of the invention [(2) of example 2] with that for a conventional coating composition [(3) of example 2] are shown:

This 25 percent average increase in production rate is of obvious importance.

EXAMPLE 7

The force required to remove the secondary jute backing from a carpet (nylon pile, jute primary) prepared from a conventional coating composition and from two coating compositions of the invention are shown in table VII. The filler used was Georgia No. 10 calcium carbonate. The conventional coating composition is a carboxylated butadiene styrene latex prepared with an anionic emulsifier, viz, Nacconol 90E, and had a bound styrene of about 42 percent. To illustrate the invention, two samples of the same monomers were emulsified with an alkyl sulfide terminated oligomer of the invention, specifically, n—octyl—S—$(CH_2CHCN)_8$—$(CH_2$—$CHCOOH)_8$—H. In one, the bound styrene was 56 percent, while in the other, it was 38 percent. The drying conditions were 20 min. at 260° F.

Results of the Scott tensile test (average value) at various filler loading and application levels are as follows:

TABLE VI

| Mill | | Carpet[a] | | Conventional coating composition Application | | Coating composition of the invention Application | | Ratio of application rates |
|---|---|---|---|---|---|---|---|---|
| Oven length, ft. | Oven temp., °F. | Pile fiber | Primary backing | Rate, ft./min. | Level, oz./yd.² | Rate, ft./min. | Level, oz./yd.² | |
| Type dryer: | | | | | | | | |
| Single pass | 100 | 285 | N | J | 8 | [b] 28 | 10 | [b] 22 | 1.25 |
| Dalton three pass | 60 { | 350 | N | J | 17.5 | [c] 28 | 20 | [c] 22 | 1.15 |
|  |  | 285 | N | WP | 11.5 | [c] 28 | 15 | [c] 22 | 1.30 |
| Single pass | 100 | (d) { | N | WP | 14.5 | [c] 30 | 20 | [c] 21 | 1.38 |
|  |  |  | P | J | 14.0 | [c] 29 | 17.5 | [c] 24 | 1.25 |
|  |  |  | N | J | 17.5 | [c] 29 | 20 | [c] 24 | 1.14 |
| Average | | | | | | | | | 1.25 |

[a] Jute secondary backing in all runs.
[b] 60% solids.
[c] 70% solids.
[d] Top 280, bottom 370.

NOTE.—N=nylon; P=polypropylene; J=jute; WP=woven polypropylene.

TABLE VII

| Coating composition | Conventional | | | Invention | | | | | | |
|---|---|---|---|---|---|---|---|---|---|---|
| Bound styrene, percent | 42 | | | 56 | | | 38 | | | |
| Filler, parts/100 parts polymer | 200 | 300 | 500 | 200 | 300 | 500 | 200 | 300 | 500 | 900 |
| Application level (oz. dry compound/yd.² carpet): | | | | | | | | | | |
| 20 | 9.0 | 5.5 | 3.0 | 17.5 | 13.0 | 8.0 | 13.5 | 7.0 | 5.5 | 2.0 |
| 24 | 12.0 | 8.8 | 5.0 | 24.5 | 16.0 | 9.5 | 16.5 | 11.3 | 7.5 | 4.5 |
| 28 | 15.0 | 9.0 | 6.0 | 40.0 | 19.5 | 13.5 | 23.5 | 15.0 | 9.5 | 5.0 |

The above data illustrate the consistently higher adhesivity of the carpet of the invention as contrasted to the one prepared by using a conventional emulsifier in preparing the coating composition. Surprisingly, even at a lower bound styrene, the invention shows a marked superiority. That comparable adhesivity at higher loading can be obtained is a primary economic factor.

Having thus described my invention, what I claim and desire to protect by Letters Patent is:

1. A coating composition which comprises a stabilized latex containing, in admixture therewith, a stabilizer selected from the group consisting of alkali metal polyphosphates, alkali metal silicates, condensation products of formaldehyde with naphthalene sulfonic acid, and alkali metal salts of polymerized carboxylic acids, and inert filler and an alkyl sulfide terminated oligomer having an average molecular weight between about 200 and 5,000, the oligomeric portion of which has a backbone of from four to 100 carbon atoms on which there are attached at least 2 appendant polar groups, at least one of which is strongly polar, said oligomer being the reaction product between
   a. an alkyl mercaptan wherein the alkyl has from about six to 12 carbon atoms;
   b. a member selected from the group consisting of acrylonitrile, acrylamide and methacrylamide; and
   c. a member selected from the group consisting of acrylic acid, methacrylic acid and itaconic acid.

2. A coating composition which comprises a stabilized latex containing, in admixture therewith, a stabilizer selected from the group consisting of alkali metal polyphosphates, alkali metal silicates, condensation products of formaldehyde with naphthalene sulfonic acid, and alkali metal salts of polymerized carboxylic acids, an inert filler and an oligomer having the formula:

$$R-S(CH_2-CHCN)_a-(CH_2-CR_1COOH)_b-H,$$

wherein R is a primary or secondary alkyl group having from six to 12 carbon atoms; $R_1$ is hydrogen or methyl; $a+b$ is from 4 to 50 and $a/a+b$ is from 0 to 0.6; said oligomer being present in the form of a water-soluble salt selected from the group consisting of the ammonium, lower alkyl, alkanol substituted ammonium, and alkali metal salts thereof.

3. The coating composition of claim 2 wherein R is a normal alkyl group having from seven to 11 carbon atoms; $a+b$ is from 12 to 30; and $a/a+b$ is from 0.2 to 0.55.

4. A coating composition which comprises a stabilized latex containing, in admixture therewith, a stabilizer selected from the group consisting of alkali metal polyphosphates, alkali metal silicates, condensation products of formaldehyde with naphthalene sulfonic acid, and alkali metal salts of polymerized carboxylic acids, an inert filler and an oligomer having the formula:

$$R-S-(CH_2-CR_1COOH)_a-(CH_2-CR_2CONH_2)_b-H,$$

wherein R is a primary or secondary alkyl group having from seven to 12 carbon atoms; $R_2$ is a hydrogen or methyl; $R_1$ is hydrogen, methyl or $-CH_2COOH$; $a+b$ is 6 to 50 and $a/a+b$ is from 0.075 to 0.4; said oligomer being present in the acid form or in the form of a water soluble salt selected from the group consisting of the ammonium, lower alkyl, alkanol substituted ammonium, and alkali metal salts thereof.

5. The coating composition of claim 4 wherein R is a normal alkyl group having from eight to 10 carbon atoms; $R_1$ is hydrogen or $-CH_2COOH$; $a+b$ is from 12 to 30; and $a/a+b$ is from 0.075 to 0.15.

6. The coating composition of claim 1 wherein said latex is an addition polymer of a monomeric material selected from the group consisting of vinyl and conjugated diolefin-type monomeric materials.

7. The coating composition of claim 6 wherein in the monomeric material is butadiene and styrene.

8. The coating composition of claim 1 wherein said latex is carboxylated.

9. The coating composition of claim 1 wherein said latex is a carboxylated butadiene styrene latex.

10. The coating composition of claim 1 wherein said stabilizer does not substantially lower the surface tension of the latex.

11. The coating composition of claim 2 wherein said stabilizer does not substantially lower the surface tension of the latex.

12. The coating composition of claim 4 wherein said stabilizer does not substantially lower the surface tension of the latex.

13. A method of forming a coated textile article which comprises applying to said article the coating composition of claim 1.

14. The method of claim 13 wherein said textile article is a carpet.

15. A textile article coated with the coating composition of claim 1.

16. A method of forming a carpet having a secondary backing which comprises adhering said carpet to said secondary backing with the coating composition of claim 1.

17. A carpet having a secondary backing adhered thereto with the coating composition of claim 1.

18. The coated article of claim 15 wherein said latex is an addition polymer of a monomeric material selected from the group consisting of vinyl and conjugated diolefin-type monomeric materials.

19. The coated article of claim 18 wherein the monomeric material is butadiene and styrene.

20. The coated article of claim 15 wherein the textile fabric is a carpet.

* * * * *

PO-1050
(5/69)

UNITED STATES PATENT OFFICE
CERTIFICATE OF CORRECTION

Patent No. 3,632,466          Dated January 4, 1972

Inventor(s) CHARLES R. PEAKER

It is certified that error appears in the above-identified patent and that said Letters Patent are hereby corrected as shown below:

Column 1, line 17: " 'guick-set' " should read -- "quick-set" --.
Column 2, line 58, that portion of the formula reading:
"-CH$_1$COOH)$_b$-H" should read -- -CR$_1$COOH)$_b$-H --; line 62: After "bon" insert -- atoms; --; line 64: "0 to, most" should read -- 0 to 0.6, most --; line 71, that portion of the formula reading: "-CR$_2$CONH$_2$)$_b$b-H" should read -- - CR$_2$CONH$_2$)$_b$-H --.
Column 3, Example (1) in the Table, that portion of the formula reading:

"n-C$_8$H$_{17}$S[ CH$_2$-" should read -- n-C$_8$H$_{17}$S$+$CH$_2$- --;

Example (3) in the Table, that portion of the formula reading:

"$+$CH$_2$-CH-$]$-H     should read    $+$CH$_2$-CH-$]$-H
     CONH$_2$ ] 18                               CONH$_2$ ] 18   --.

Column 4, line 75: "wisely" should read -- widely --;
Column 5, line 51: "U.S. application" should read -- U.S. patent applications --; line 72: "as" should read -- an --. Column 10, line 57: "90E," should read -- 90F, --. Column 11, line 16: "and" should read -- an --. Column 12, line 17: After "wherein" delete "in".

Signed and sealed this 23rd day of January 1973.

(SEAL)
Attest:

EDWARD M. FLETCHER, JR.          ROBERT GOTTSCHALK
Attesting Officer          Commissioner of Patents

R